United States Patent [19]

Brown

[11] Patent Number: 4,882,929

[45] Date of Patent: Nov. 28, 1989

[54] APPARATUS AND PROCESS FOR MEASURING CHANGES IN EFFECT OF TIDAL FORCES

[75] Inventor: Robert L. Brown, Buena Park, Calif.

[73] Assignee: Total Environmental Services Technology, Inc., Huntington Beach, Calif.

[21] Appl. No.: 150,085

[22] Filed: Jan. 29, 1988

[51] Int. Cl.$^4$ ............................................. G01M 3/26
[52] U.S. Cl. ................................... 73/49.2; 73/290 R
[58] Field of Search ...................... 73/49.2, 290 R, 291

[56] References Cited

U.S. PATENT DOCUMENTS

| | | | |
|---|---|---|---|
| 3,460,386 | 8/1969 | Guignard | 73/290 |
| 3,841,146 | 10/1974 | Cross et al. | 73/49.2 |
| 3,889,523 | 6/1975 | Nolte | 73/49.2 |
| 4,373,815 | 2/1983 | Bruce | 356/358 |
| 4,397,183 | 8/1983 | Ballou et al. | 73/293 |
| 4,474,054 | 10/1984 | Ainlay | 73/49.2 |
| 4,561,291 | 12/1985 | Ainlay | 73/49.2 |
| 4,581,931 | 4/1986 | Robotti et al. | 73/311 |
| 4,604,893 | 8/1986 | Senese et al. | 73/49.2 |
| 4,646,560 | 3/1987 | Maresca, Jr. et al. | 73/49.2 |
| 4,672,842 | 6/1987 | Hasselmann | 73/49.2 |

FOREIGN PATENT DOCUMENTS

| | | | |
|---|---|---|---|
| 97410 | 6/1982 | Japan | 73/290 R |
| 80001 | 4/1986 | Japan | 73/290 R |

OTHER PUBLICATIONS

Underground Tank Leak Detection Method: A State-of-the—Art Review dated Jan., 1986 by U.S. Environmental Protection Agency.

Primary Examiner—Hezron E. Williams
Attorney, Agent, or Firm—Klein & Szekeres

[57] ABSTRACT

Changes in the tide effects at a given location are measured by monitoring the respective levels of a measuring liquid in two containers which are in fluid communication with one another. The liquid levels are measured by suitable transducers including floats, and result in electronic signals indicative of the respective positions of the floats. A difference between the two signals is either computed or obtained from a differential amplifier into which the signals indicative of the respective float positions are inputted. A change in the difference between the float positions measures a change in the tidal effects at the location. The change in tidal effects is advantageously measured in conjunction with measuring leakage of liquid from liquid storage tanks, such as fuel storage tanks of filling stations, where tide effects occur and must be taken into account. The measured change in tide effects is inputted into a computer which also receives the input of a float containing transducer system measuring liquid level in the storage tank. The measured tide effects are then taken into consideration when the leakage rate of the tank is computed.

28 Claims, 3 Drawing Sheets

APPARATUS AND PROCESS FOR MEASURING CHANGES IN EFFECT OF TIDAL FORCES

BACKGROUND OF THE INVENTION

1. Field of the Invention

The present invention is directed to an apparatus and process for measuring changes in the effect of tidal forces at a given location on earth. More particularly, the present invention is directed to an apparatus and process which measures changes in the effects of tidal forces in conjunction with measuring leakage of liquids from storage tanks (such as underground fuel tanks used in filling stations) for providing a corrective factor to be considered in the measurements of such leakage.

2. Brief Description of the Prior Art

Leakage of hazardous liquids, such as hydrocarbon fuels, from storage tanks into the environment represents a significant and ubiquitous hazard. Specifically, leakage of fuel from underground fuel tanks of filling stations in the United States and elsewhere has been of great environmental concern, and the subject of laws and regulations which, generally speaking, define the upper limit of permissible leakage at 0.05 gallons per hour.

Those who are familiar with the state of the art know that measuring leakage at a rate of 0.05 gallons per hour from an underground tank of 10,000 gallons or larger capacity, is a very difficult task. It is said sometimes, that the difficulty of this measurement is comparable to measuring the loss (or addition) of a single drop of liquid in a bucket full of the liquid.

As is well known, there are many factors which contribute to the difficulty of measuring leakage from underground fuel storage tanks of fillings stations (and the like) with the above-noted legally required degree of accuracy. Temperature effects are one major cause of difficulty, because they result in contraction or expansion of the fuel in the tank, which, when measured as apparent "leakage", may well be greater than the legally permissible limit of 0.05 gallon per hour.

Another difficulty is that the walls of cylindrical tanks are curved so that the fuel depth-versus-volume relationship in the tank is not linear. When an attempt is made to overcome this difficulty by filling the tank to the brim, up to the vertically disposed cylindrical fill pipe, then another cause for error arises. This error is caused by the unusually large hydrostatic pressure in the tank, which causes unpredictable expansion of the tank walls.

A currently pending patent application, filed on Mar. 16, 1987 and having Serial No. 026,113 in the United States Patent and Trademark Office, and assigned to the same assignee as the present application, describes a process whereby specific steps are taken to measure and calculate the effect of temperature induced contraction or expansion of fuel in the tank. U.S. Pat. No. 4,646,560 also describes an apparatus which compensates for the temperature effects in the tank.

For further description of apparatus relating to the measuring of leakage of liquid from storage tanks, reference is made to U.S. Pat. Nos. 4,397,183; 4,373,815; 4,474,054; 4,561,291; 4,672,842; 3,841,146; 3,460,386; 4,604,893; 3,889,523; and to a publication by the United States Environmental Protection Agency, titled UNDERGROUND TANK LEAK DETECTION METHOD: A STATE-OF-THE-ART REVIEW, dated January, 1986.

Whereas the above-noted and other devices attempt to monitor the level of fuel in the tank by accurate monitoring of the position of a float in the tank, and whereas some of the above-noted devices also attempt to measure or compensate for temperature effects, the present applicant is unaware of prior art devices which measure or compensate for tidal effects in the tanks. Nevertheless, it has been discovered in accordance with the present invention that tidal effects surprisingly do occur in underground storage tanks, and that such tidal effects can seriously interfere with the measurements of leakage from the tanks. Accordingly, there is a need in the art for a process and apparatus which measures and compensates for the tidal effects. The present invention provides such process and apparatus.

SUMMARY OF THE INVENTION

It is an object of the present invention to provide a process and apparatus for measuring changes in tidal effects at a given location.

It is another object of the present invention to provide a process and apparatus for utilizing the measured changes in tidal effects to obtain substantially correct measurements of leakage of liquid from storage tanks.

It is still another object of the present invention to provide a process and apparatus for measuring leakage of liquid from liquid storage tanks which measurements take into consideration, and correct for tidal effects which occur in the tank.

The foregoing and other subjects and advantage are attained by a process and apparatus having two containers in fluid communication with one another and disposed with their interconnecting axis being substantially parallel with a liquid storage tank in the proximity of the containers. The containers contain a measuring liquid. The level of the measuring liquid is disposed in accordance with the sum total of the gravitational forces, including tidal forces, acting upon the liquid.

A float is mounted in each container to rise and fall with the level of the measuring liquid therein. The level of the measuring liquid in both containers is monitored for a predetermined time period by sensing the positions of the respective floats. Signals indicating the position of the floats are compared to one another and a difference signal is derived from the comparison.

A change in the difference signal is indicative of a change in tidal effects which have occurred during the time of the measurement. The change in the difference signal can be utilized theoretically, in calculations, as a measure of the change in tidal effects during the time period. The change in the difference signal can also be used as an input signal for a computer which calculates leakage of liquid from the storage tank measured by a separate float and sensor assembly.

The features of the present invention can be best understood, together with further objects and advantages, by reference to the following description taken in conjunction with the accompanying drawings.

DESCRIPTION OF THE PREFERRED EMBODIMENTS

The following specification taken in conjunction with the drawings sets forth the preferred embodiments of the present invention. The embodiments of the invention disclosed herein are the best modes contemplated by the inventor for carrying out his invention in a commercial environment, although it should be understood that several modifications can be accomplished within the scope of the present invention.

Figure 1:
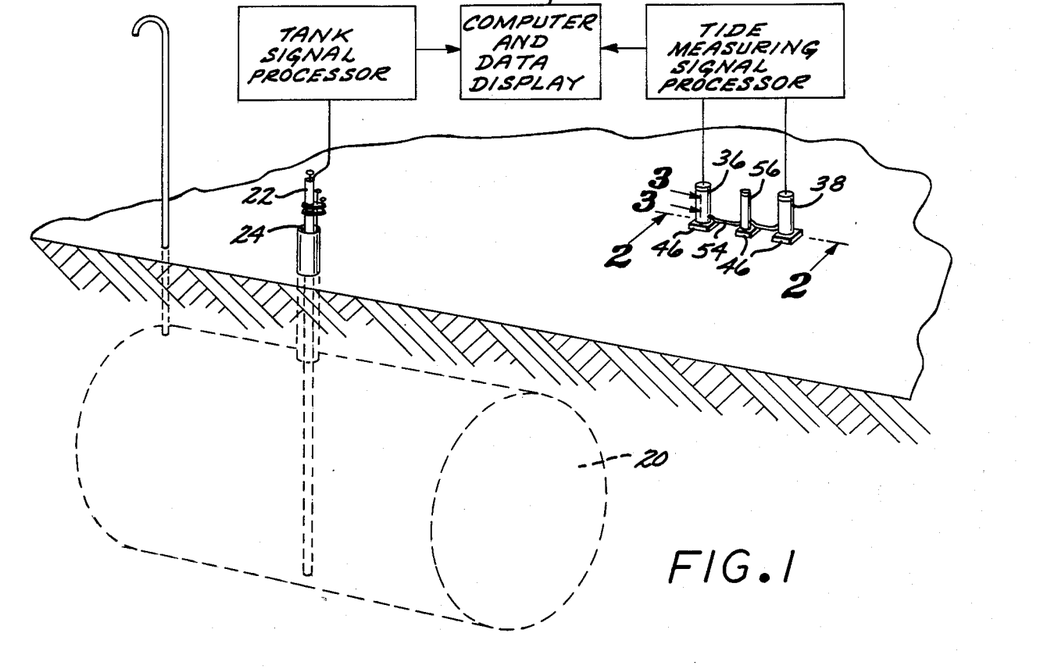
FIG. 1 is a view showing in perspective and in schematics a first preferred embodiment of the tide effect measuring apparatus of the present invention, used in conjunction with an apparatus for measuring leakage of liquid from an underground storage tank.

Referring now to the drawing Figures, and particularly to the schematic, perspective view of FIG. 1, it has been discovered in accordance with the present invention that tidal effects do occur in liquid storage tanks, and are often of such magnitude that, unless they are measured and taken into consideration, they seriously affect the accuracy of measurements of leakage from the tank.

More particularly, FIG. 1 discloses typical cylindrical underground fuel tank 20 of a filling station. As is well known, virtually every filling station in the United States and elsewhere in the industrialized world has one or more such underground fuel tanks 20, containing hydrocarbon motor fuel. Leakage of fuel from such tanks 20, or leakage of ground water into the tanks 20, is measured by various apparatus which are disclosed, for example, in U.S. Pat. Nos. 4,646,560 and 4,397,183, and in the copending application of the present applicant-assignee, Ser. No. 023,113, filed on Mar. 16, 1987. The specifications of U.S. Pat. Nos. 4,646,560 and 3,397,183 are hereby expressly incorporated by reference.

Figure 2:
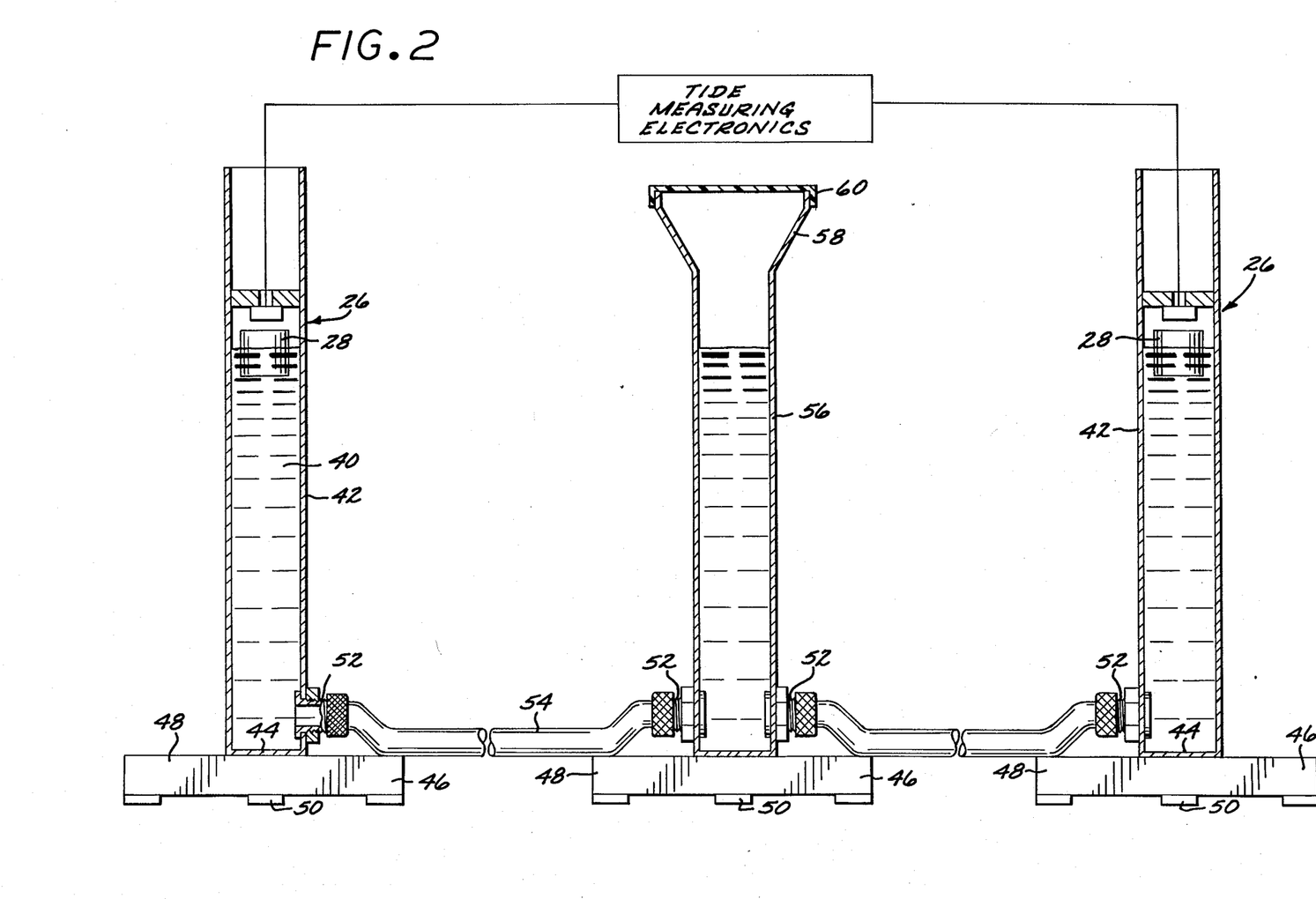
FIG. 2 is a schematic cross-sectional view showing the first preferred embodiment of the tide effect measuring apparatus of the present invention, the cross-section being taken on lines 2,2 of FIG. 1.
Figure 3:
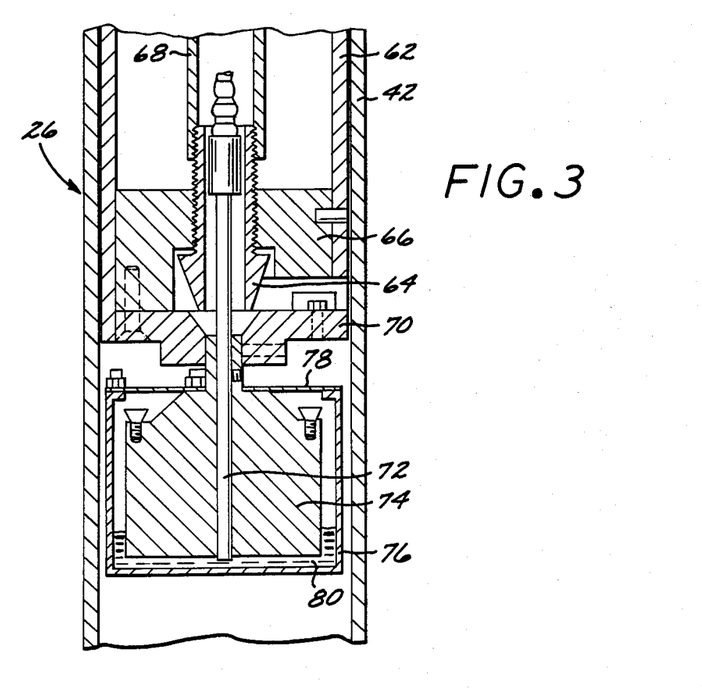
FIG. 3 is a detailed cross-sectional view of the float and float sensor assembly utilized in the first preferred embodiment, the cross section being taken on lines 3,3 of FIG. 1.

Briefly summarized for the purposes of clarity of the present description, and with reference to FIGS. 1–3, the leakage measuring apparatus for the storage tank 20 includes a tube 22 which is mounted in the fill hole 24 of the underground fuel tank 20. A float and sensor assembly 26 including a float 28 and means for sensing linear displacement of the float 28 is mounted partly in the tube 22 and is partly located outside of the tank 20 as an electronic instrument.

The means for sensing the linear displacement of the float 28 may be constructed in accordance with various established practices in the art. In the preferred embodiments of the present invention, the position, or better stated linear displacement, of the float 28 is sensed or monitored by a non-contact fiber optic probe displacement sensor, such as the MTI Model KD 320 fotonic sensor manufactured by Mechanical Technology, Inc. of Latham, N.Y. It should be understood, however, that the manner of sensing or monitoring the linear displacement of the float 28 in the storage tank 20 is not critical for the practice of the present invention; in addition to fiber optic probe displacement sensors, laser interferometer displacement sensors (such as LASER MEASUREMENT SYSTEM Model No. 5528A manufactured by Hewlett-Packard Corporation), eddy current type probe displacement sensors, and capacitance type probe displacement sensors may also be used.

What is important in connection with the apparatus for measuring leakage of fuel from the storage tank, is that the position of the float 28 is tracked and through suitable transducers results in an electric signal 30. When, as in the herein described preferred embodiment, the probe displacement sensor is of the fiber optic type, then an optical signal indicative of the displacement of the float 28 is converted into the electric signal 30. This is accomplished in accordance with the state-of-the-art in an instrument indicated in the diagrammatic views of FIGS. 1, 4 and 5 as "tank signal processor" 32.

The electric signal 30 derived from the position of the float 28 in the fuel storage tank 20 is then inputted into a computer wherein leakage of the fuel tank 20 during the measured time period is calculated. On FIGS. 4 and 5, the computer is shown schematically, and bears the reference numeral 34. On FIG. 1, the computer is schematically shown together with a "data display" device under the reference numeral 34a. Preferably, the leakage measurement system, including the float and sensor assembly 26 is of the type described in copending application Ser. No. 026,113.

A principal feature of the present invention is that the tidal effects are measured in the proximity of the fuel storage tanks 20, and substantially during the same time period during which leakage from the tank 20 is measured. Data obtained in the tide effect measurements are then utilized in the computer 34 to take the tidal effects into consideration, and thereby correct the otherwise erroneous or incomplete data obtained in the leakage measurements.

The tidal effects which are measured in accordance with the present invention are, in principle, similar to ocean tides, and are believed to be caused by the same forces, namely by the gravitational pull of celestial bodies on the liquid which is in the storage tank 20. These tidal effects cause the stored liquid to move from one end of the storage tank to the other, and therefore manifest themselves at any given point in the tank as level changes. Experience has shown that the tidal effects in storage tanks occur on a cyclical basis, like ocean tides, but do not coincide in timing or in height with the ocean tides. Because the tidal effects effectively cause a see-saw like movement of the liquid mass relative to the longitudinal center line of the tank 20, the precise degree of the level change at any given point in the tank 20 is a function of the distance of that point from the center line of the tank 20.

In order to monitor the above noted tidal effects, the measuring apparatus of the invention includes a first container 36 and a second container 38 for a measuring liquid 40. The measuring liquid 40 is preferably simply water, and the first and second containers 36 and 38 are in fluid communication with one another through a channel or duct. FIG. 1 shows that the two containers are located in the proximity of the underground storage tank 20, and in such a manner that the "axis" or theoretical straight line interconnecting the two containers 36 and 38 is substantially parallel with the horizontal longitudinal axis of the storage tank 20. Experience has shown that it is important to locate the two containers 36 and 38 of the tide measuring apparatus substantially parallel with the horizontal longitudinal axis of the tank 20. However, the containers 36 and 38 need to be only reasonably close to the storage tank 20; for example placing them in a building (not shown) adjacent to the tank 20 is adequate and offers certain advantages which are described below.

FIG. 2 discloses in detail the structure of the preferred embodiment of the tide effect measuring apparatus. Thus, the first and second containers 36 and 38 of the preferred embodiment each comprise an approximately 15 inch long aluminum tube section 42 which is 2.040 inches thick in diameter, and is sealed in the bottom by a closure plate 44. In this connection, it is noted that the preferred embodiment of the tide effect measuring apparatus advantageously utilizes substantially the same type of float and sensor assembly 26 as is used in the storage tank 20. Moreover, because in the preferred embodiment the tube 22 used for mounting the float and sensor assembly 26 into the standard fill holes 24 of storage tanks has a diameter of 2.040 inches, the tube sections 42 used for measurements of tide effects are preferably also made from the same diameter tube.

The tube sections 42 are mounted to stand in upright, vertical positions on pedestals 46. The pedestals 46 of the preferred embodiment comprise a substantially disc shaped ¼ inch thick steel plate 48 of approximately 1.0 foot diameter. Three small steel feet 50 support the plate 48. The tube sections 42 are attached to the pedestal 46 by an adhesive (not shown) or by other suitable fasteners (not shown).

A sideways projecting nipple 52 is fastened to each tube section 42 substantially at its bottom, and a rubber or like hose 54 is attached to the nipples 52. The hose 54 establishes fluid communication between the two tube sections 42. Each tube section 42, or phrased in another way, each container 36 and 38, has a float and sensor assembly mounted in it so that the top of the float 28 is located at a height of approximately 8 inches above the pedestal 46. Preferably, as in the herein described specific embodiments, the float and sensor assembly 26 is of the same type, and even of the same manufacture, as the float and sensor assembly used for monitoring fluid level in the fuel storage tank 20. Detailed structure of the float mechanism of the preferred embodiments is described below in connection with FIG. 3. In this regard, it should be noted that FIG. 2 discloses the containers 36 and 38 and their support pedestals 46 substantially accurately. However, the float and sensor assembly 26 is shown only schematically on FIG. 2; its actual construction is depicted on the cross-sectional view of FIG. 3.

FIGS. 1 and 2 show a third upright standing tube 56 affixed to, and supported by a pedestal 46 of substantially the same construction as the pedestals 46 which support the first and second containers 36 and 38. The third tube 56 is also in fluid communication with the first and second containers 36 and 38. The purpose of the third tube 56 is to permit addition or withdrawal of the measuring liquid 40 to the system without needing to interfere with the containers 36 and 38 wherein the float and sensor assemblies are mounted. Thus, the measuring liquid 40 (preferably water) can be added or withdrawn from the tide measuring apparatus through the third container or tube 56, so as to bring the liquid level into a range where the float and sensor assembly is operational. Using the third tube 56 for this function usually obviates the need for moving the adjustably mounted float assembly up or down in the first and second containers 36 and 38. In order to facilitate adding or withdrawing liquid 40 from the third container 56, the third container 56 has a flared mouth 58. It is also covered by a suitable cap 60.

Referring now to FIG. 3 of the appended drawings, the structure of the float and sensor assembly 26 of the preferred embodiments of the apparatus of the present invention is disclosed in detail. In the preferred embodiments, substantially identical non-contact fiber optic type float and sensor assemblies are used in the storage tank 20, and in the first and second containers 36 and 38. It is emphasized in connection with this description, however, that other types of float and sensor assemblies may also be used, in the present invention. The float and sensor assembly of he herein disclosed preferred embodiment is also described in the present applicant's co-pending application Ser. No. 026,113.

Thus, with specific reference to FIG. 3, the tube section 42 comprising the first container 36 (or the second container 38) is shown. The tube section 42 as shown on FIG. 3, may also comprise the tube 22 used in the leakage measuring apparatus mounted into the fill hole 24 of the storage tank 20. A mounting tube 62 of lesser diameter than the tube section 42 telescopically fits into the tube section 42. A clamping mechanism is mounted to the bottom of the mounting tube 62. The clamping mechanism includes a cone-shaped member 64 which is threadedly mounted to a bottom closure member 66 of the mounting tube 62. The position of the cone-shaped member 64 can be controlled from the surface by manually turning a rotatable shaft 68 coaxially disposed within the mounting tube 62. The cone-shaped member 64 engages three clamping dogs 70, only one of which is visible on FIG. 3. The clamping dogs 70 engage the interior of the tube section 42. It should be apparent from the foregoing that by wedging the clamping dogs 70 against the interior of the tube section 42, the assembly can be mounted at substantially any desired location in the tube section 42. Adjustment of the positioning of the assembly is performed, if necessary, from the surface before the clamping dogs 70 are tightened by a conventional adjusting mechanism.

A shaft 72 protrudes from the center of the mounting tube 62 and is carried by the mounting tube 62 independently of the rotational positioning of the cone-shaped member 64. One or more optical fibers (not shown) are disposed within the shaft 72 and comprise part of the state-of-the-art displacement sensor assembly A piston 74 is fixedly mounted to the shaft 72. A float cup 76 is placed around the piston 74, but is nevertheless capable of moving freely relative to the piston 74 in a linear, up-and-down direction. The float cup 76 is restricted in any potential sideways movement by a compliant glass fiber fabric, resilient rubber or like diaphragm 78 mounted on the top of the float cup 76. A center hole in the diaphragm 78 accomodates the shaft 72. A dampening fluid 80, such as a commercially available silicone dampening fluid, may be present in the float cup 76. The fiber optic sensor measures the displacement of the bottom of the float cup 76 from the shaft 72.

A principal advantage of the above-described float and sensor assembly is that the diaphragm substantially prevents friction and stiction of the float cup 76 to the interior walls of the tube section 42. Placing the clamping dogs 70 close to the liquid surface provides the additional advantage that the fixed reference point thermally expands (or contracts) only with that portion of the measuring tube which is under liquid.

Figure 4:
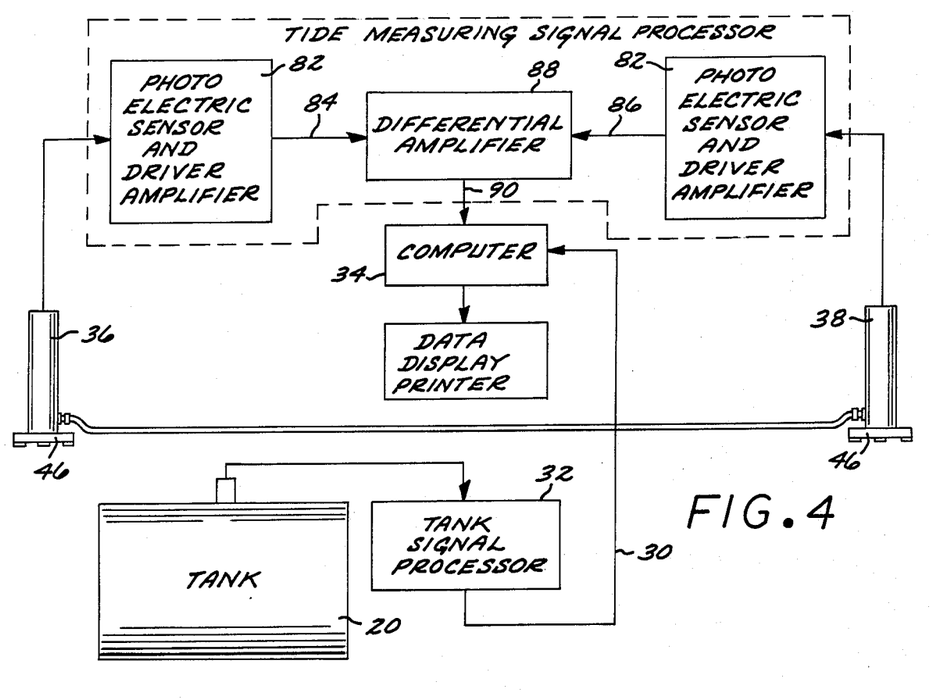
FIG. 4 is a block diagrammatic view showing the operation of the first preferred embodiment.

Referring now principally to the block diagrammatic views of FIG. 4, the operation of the tide effect measuring apparatus is explained, primarily as it is used in conjunction with the leakage measuring apparatus mounted to the fuel tank 20. As it was noted above, the tide effect measuring apparatus is positioned in such a manner that the line interconnecting the containers 36 and 38 is substantially parallel with the longitudinal axis of the underground fuel storage tank 20. This assures that the measured tide effects are substantially the same as the effects experienced by the liquid stored in the storage tank 20. For accurate measurements, it is important, however, to expose the first and second containers 36 and 38 of the tide effect measuring apparatus to substantially identical temperature effects. Therefore, it is often desirable to place the tide effect measuring apparatus in a building close to the storage tank. It is certainly important to avoid positions where one of the two containers 36 and 38 is more exposed to the elements, such as wind, sun or shade effects, than the other.

In accordance with the invention, tidal effects are measured substantially during the same time period during which leakage from the tank 20 is measured. As is shown on FIG. 4, the signal obtained from the float and sensor assembly 26 of each container 36 and 38 is inputted into a driver amplifier circuit to obtain an electric signal (preferably in the form of a voltage level) which is indicative of the liquid level in the respective container. In the herein described preferred embodiment, the signal emanating from the fiber optic sensor is an optical signal. Therefore, the optical signal is first processed through a photo electric sensor. In the diagrammatic drawing of FIG. 4, a "box" symbolizing the photo electric sensor and associated driver amplifier circuit bears the reference number 82.

Thus, an amplified electric signal (voltage level) is obtained from the position of each float. These signals are symbolically shown on FIG. 4 with the reference numerals 84 and 86 respectively. A difference between these two signals is indicative of the difference in the positions of the respective liquid levels in the first and second containers 36 and 38. In accordance with one specific embodiment of the invention, the electric signals 84 and 86 are inputted into a differential amplifier 88. The differential amplifier 88 compares the two signals 84 and 86 and produces an electric signal (voltage level) 90 which is indicative of the difference between the two signals 84 and 86. In effect, the signal 90 produced by the differential amplifier 88 is linearly proportional to the difference in the levels of the measuring liquid 40 in the containers 36 and 38.

On FIG. 4, the photo electric sensor and driver amplifier circuit 82 plus the differential amplifier 88 are jointly labelled in a "box" formed with dashed lines as "tide measuring signal processor".

In the practice of the invention, it is of course unnecessary to measure absolute differences in the liquid levels. It is sufficient to measure the change in the liquid levels in the containers 36 and 38 during the time period while the leakage measurement is conducted. Accordingly, at least in principle, it is sufficient to record the value of the signal 90 outputted by the differential amplifier 88 at the beginning and at the end of the test, which typically lasts approximately 2 to 8 hours. In actual practice, however, it is preferred to continuously monitor and record the output 90 of the differential amplifier 88.

The signal output 90 of the differential amplifiers 88 is then inputted through an appropriate analog to digital converter (not shown) into the computer 34 which also receives the input 30 of the tank signal processor 32. Accordingly, the computer 34 utilizes the change in the levels of the measuring liquid 40 of the tide effect measuring apparatus, as one factor for calculating the amount of leakage of stored liquid from the tank 20.

More specifically, tidal effects in the tank 20 result in a change in liquid level at the position of the float 28 which is linearly proportional to the distance of the float 28 from the center line of the tank 20. A typical 10,000 gallon fuel storage tank is approximately 27 feet long. The first and second containers 36 and 38 are placed approximately 8 to 10 feet apart from one another for the tide effect measurements. However, tide effect measuring in accordance with the present invention preferably includes monitoring both the rise of liquid level in one container and the corresponding fall of liquid level in the other connected container, whereas the float 28 in the storage tank 20 experiences only either a rise or a fall. Accordingly, the foregoing factors, including the distance of the float 28 from the center line of the tank 20 as compared to the distance of the two containers 36 and 38 from each other, are taken into consideration during the calculations.

Figure 5:
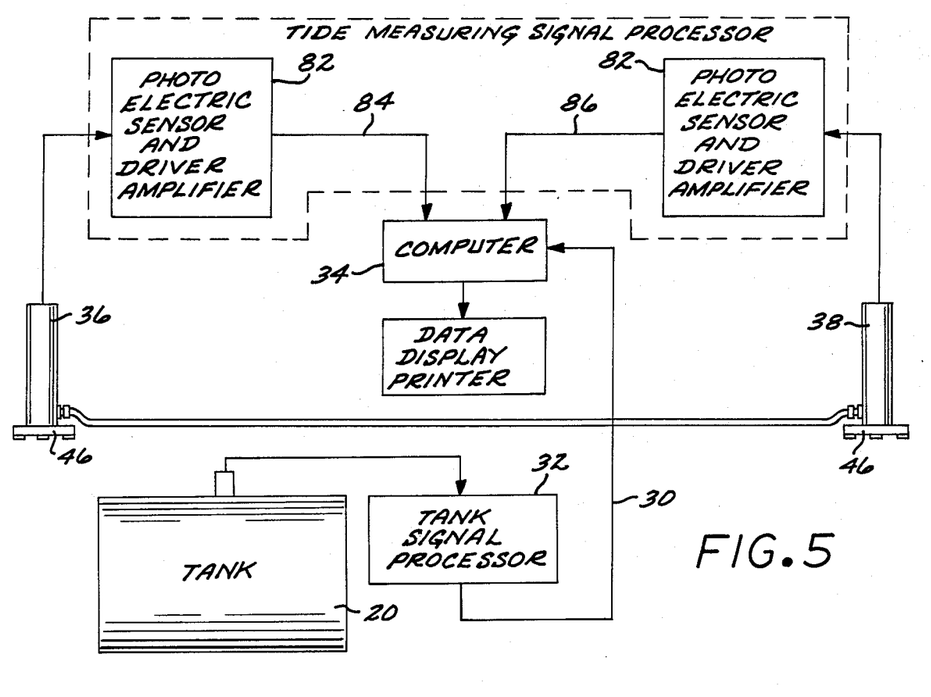
FIG. 5 is block diagrammatic view showing the operation of the second preferred embodiment.

FIG. 5 shows in block diagram another embodiment of the present invention. The difference between the embodiment shown on FIGS. 4 and 5 is that the differential amplifier is omitted from the embodiment shown on FIG. 5. In this embodiment, the amplified signals 84 and 86, which are indicative of the respective liquid levels in the containers 36 and 38, are directly inputted, through suitable analog to digital converters (not shown), into the computer 34. The computer 34 then performs the function of calculating the difference between the liquid levels in the two containers 36 and 38.

Electronic equipment, which is capable of performing the above described functions, is readily available within the state of the electronic arts. The photoelectric sensor and driver amplifier 82 used in the preferred embodiments of the apparatus of the present invention actually comprise part of the above noted commercially available MTI Model No. KD 320 fotonic sensor. The differential amplifier 88 of the preferred embodiment shown on FIG. 4 is a National Semiconductor LM 108 model. The analog to digital converters (not shown) which are used to convert analog signals suitable for input into the computer 34 are in the preferred embodiments Metrabyte Dash-8 models.

Experience with the process and apparatus of the present invention has shown that a float mounted into the fill hole of a typical 10,000 gallon underground fuel storage tank 20 may "experience" during a six hour test period, a liquid level change as high as 0.040 inch, due to tidal effects only. Such a change, if not within the substantially cylindrical fill tube of the tank, (and if not properly attributed to tidal effects) would correspond to an "apparent" leakage rate of approximately 0.33 gallon/hour. In light of the foregoing, in order to obtain accurate leakage measurements, it is virtually necessary to measure the tidal effects and to take them into consideration.

It will be readily understood by those skilled in the art, that there may be other occasions where accurate measurements of tidal influences, or better stated, changes in tidal influences, is desired outside of the fluid level monitoring field. Moreover, in the present state of geophysics and related arts, there exist tables and calculation which attempt to predict tidal effects on the basis of known movements of the moon and other celestial bodies. These tables and calculations, however, fail to take earth plate movements and tilting into consideration. It is possible then in accordance with the present invention to compare actual tidal effect measurements with the tidal effects predicted from tables and calculations performed in accordance with the state of the art. The difference between the measured tidal effects and those predicted by the state of the art, provides information regarding plate movement in the earth crust.

Inasmuch as several modifications of the present invention may become readily apparent to those skilled in the art in light of the present disclosure, the scope of the present invention should be interpreted solely from the following claims as such claims are read in light of the disclosure.

What is claimed is:

1. In combination: a measuring device used in conjunction with leak detector system means which measures leakage of liquid into or out of liquid storage tanks, for providing a correction in said leak detector system means to account for liquid level changes caused by tidal forces, the combination comprising:

leak detector system means for monitoring the liquid level in a liquid storage tank;

a first container for a measuring liquid, and a second container for the measuring liquid, the first and second containers being positioned at a predetermined distance from one another, each of the first and second containers being isolated from fluid-communication with the liquid storage tank;

a duct in fluid communication with the first container and with the second container, thereby placing the first and second containers in fluid communication with one another;

first means for monitoring the level of the measuring liquid in the first container, the first means providing a first output signal indicative of the level of the measuring liquid in the first container; and second means for monitoring the level of the measuring liquid in the second container, the second means providing a second output signal indicative of the level of the measuring liquid in the second container, the difference between the first and second output signals being indicative of the difference in the heights of the measuring liquid columns in the first and second containers, and is thereby indicative of the tidal forces effects on the measuring liquid in the containers.

2. The measuring device of claim 1 wherein the first means include a first float, and wherein the second means include a second float each of which is indicative of the respective level of the measuring liquid in the respective container, and wherein the first and second means respectively include first and second displacement sensing means for sensing the position of the respective float in the respective container, the first displacement sensing means generating the first output signal, and the second displacement sensing means generating the second output signal.

3. The measuring device of claim 2 wherein the first and second displacement sensing means each comprise a non-contact fiber optic probe displacement sensor.

4. The measuring device of claim 2 wherein the first and second displacement sensing means each comprise a laser interferometer.

5. The measuring device of claim 2 further comprising signal comparing means for generating a third output signal which is indicative of the difference between the first and second output signals generated respectively by the first and second means, the signal comparing means receiving the first and second output signals, the third output signal thereby being indicative of the difference in the heights of the liquid columns in the first and second containers.

6. The measuring device of claim 5 wherein the signal comparing means comprises differential amplifier means for receiving as input the first and second output signals, respectively, of the first and second displacement sensing means, and for generating as output a signal whose voltage is substantially linearly proportional to the difference in the heights of the first and second floats, whereby the voltage of the output signal of the differential amplifier means is indicative of the effect of tidal forces on the liquid contained in the device.

7. The measuring device of claim 6 further comprising first amplifier means for amplifying the first output signal received from the first sensing means and for feeding the amplified first output signal into the differential amplifier means, and second amplifier means for amplifying the second output signal received from the second sensing means and for feeding the amplified second output signal into the differential amplifier means.

8. The measuring device of claim 2 further comprising first amplifier means for amplifying the first output signal received from the first sensing means and second amplifier means for amplifying the second output signal received from the second sensing means.

9. The measuring device of claim 2 wherein the first container is substantially vertically disposed tube, and wherein the second container is also a substantially vertically disposed tube.

10. The measuring device of claim 9 wherein the duct in fluid communication with the first and second containers is a flexible hose.

11. The measuring device of claim 2 wherein the first and second containers are positioned at approximately 6 to 30 feet distance from one another.

12. The measuring device of claim 2 wherein the first and second containers are spaced from one another disposed on an axis which is substantially parallel with the longitudinal axis of the liquid storage tank, the leakage of which is being measured.

13. A measuring device to measure the effect of tidal forces at any selected location on substantially solid ground on the surface of the earth, the device comprising:

a first container for a measuring liquid and a second container for a measuring liquid, the first and second containers being spaced from one another disposed along an axis;

duct means for establishing fluid communication between the first and second containers, the first and second containers being disposed relative to one another on sufficiently level support surface so that the measuring liquid is present in both containers, the first and second containers being isolated from fluid communication with substantial volumes of liquid so that neither the first container nor the second container is in fluid communication with a liquid storage tank or with a liquid holding balancing tank;

first and second float means disposed respectively in the first and second containers, the first and second float means each being adapted for indicating the level of the measuring liquid in the respective container;

first and second sensing and signal generating means, each sensing and signal generating means being adapted for generating, respectively, first and second signals indicative, respectively, of the positions of the respective float means;

first and second amplifier means, the first amplifier means being adapted for receiving as input the first signal and for generating an amplified first output signal indicative of the position of the first float means, and the second amplifier means being adapted for receiving as input the second signal indicative of the position of the second float means, the difference between the first and second output signals being substantially linearly proportional to the difference of the heights of the levels of the measuring liquid, respectively, in the first and second containers.

14. The measuring device of claim 13 further comprising differential amplifier means for receiving the inputs of said differential amplifier means the first and second output signals, and for generating as the output of said differential amplifier means a third signal which is substantially linearly proportional to the difference of the heights of the levels of the measuring liquid, respectively, in the first and second containers.

15. The measuring device of claim 13 wherein the first and second sensing and signal generating means each comprise a non-contact fiber optic probe displacement sensor.

16. The measuring device of claim 13 further comprising a third container in fluid communication with the duct means and therethrough with the first and second containers, the third container being accessible from the ambient environment, whereby measuring liquid can be added to the first and second containers.

17. A leak detector system for detecting leakage of liquid into or out of storage tanks, the leak detector system comprising:

first means for monitoring the level of the liquid in the storage tank, the first means being adapted for generating a first signal indicative of the level of the liquid in the storage tank, the tank having a substantially horizontally disposed longitudinal axis;

a first container for a measuring liquid, and a second container for the measuring liquid, the first and second containers being in fluid communication with one another through a duct and being disposed at a measured distance from one another in proximity of the storage tank and along an axis which is substantially parallel with the longitudinal axis of the storage tank, neither the first container nor the second container being in fluid communication with the storage tank, and second means for monitoring the difference between the levels of the measuring liquid in the first and second containers, the second means adapted for generating a second signal which is indicative of said difference and is thereby indicative of tidal effects on the measuring liquid contained in the containers, the second signal providing a value serving as a correction to a value derived from the first signal, whereby the rate of leakage calculated from the first and second signals substantially eliminates an error due to occurrence of tidal effects in the storage tank.

18. The leak detector system of claim 17 further comprising computer means receiving as inputs the first signal and the second signal, the computer means adapted for generating from said first and second signals a value indicative of the rate of leakage out of or into the storage tank.

19. The leak detector system of claim 17 wherein the first means comprise a first float floating in the liquid in the storage tank and first displacement sensor means for measuring the position of the first float and for generating the first signal indicative of the position of the first float.

20. The leak detector system of claim 17 wherein the second means comprise at least one second float disposed in one of the first and second containers and second sensor means for monitoring the position of the second float.

21. The leak detector system of claim 17 wherein the second means comprises second and third floats mounted respectively in the first and second containers, and second and third sensor means for monitoring the respective positions of these second and third floats and for generating respective signals, the difference of which is linearly proportional to the second signal indicative of tidal effects in the measuring liquid contained in the containers.

22. A process for determining changes in the magnitude of tidal effects at a given location, the process comprising the steps of:

maintaining a measuring liquid in two spaced apart containers which are in fluid communication with one another and which are isolated from any extraneous volume of liquid such as a storage tank or liquid holding balancing tank;

measuring the level of the measuring liquid in each of the containers, the step of measuring comprising a step of obtaining a signal with respect to each container which is indicative of the instantaneously measured level of the measuring liquid in each container; and obtaining a difference signal which is indicative of the difference between the instantaneously measured signals in each container, changes in said difference signal during a time period being indicative of the changes in the tidal effects at the given location during the time period.

23. The process of claim 22 wherein the step of obtaining a difference signal comprises inputting the instantaneously measured signals indicative of the levels of the measuring liquid in each container into a differential amplifier, the difference signal being the output of the differential amplifier.

24. The process of claim 22 wherein the step of measuring is conducted for a predetermined time period, and wherein the difference signal is obtained at least substantially at the beginning and at the end of the time period.

25. A process for measuring leakage of a liquid storage tank, the process comprising:

maintaining a float in the storage tank to track the level of the stored liquid;

measuring the position of the float in the stored liquid and obtaining a first signal which is indicative of the instantaneous position of the float in the stored liquid;

maintaining a first container and a second container in fluid communication with one another and in the proximity of the liquid storage tank, the axis interconnecting the first and second containers being disposed substantially parallel with the horizontal longitudinal axis of the storage tank, and maintaining a measuring liquid in the first and second containers;

measuring the difference between the heights of the columns of measuring liquid in the first and second containers, and obtaining a second signal which is indicative of said difference;

performing the above-defined steps of measuring at least at the beginning and at the end of a predetermined time period, the difference between the first signals obtained at the beginning and at the end, respectively, being indicative of apparent leakage of the storage tank during the time period, and the difference between the second signals obtained at the beginning and at the end respectively being indicative of a change in tidal effects during the time period, the difference between the second signals providing a corrective factor for calculating actual leakage of the storage tank during the time period.

26. The process of claim 25 wherein the step of measuring the difference between the heights of the columns of measuring liquid in the first and second containers comprises maintaining a float in each container to track the level of measuring liquid in each container, and obtaining signals indicative of the positions of said float in the containers.

27. The process of claim 26 further comprising the steps of inputting the signals indicative of the positions of the respective floats in the containers into a differential amplifier, the output of the differential amplifier being the second signal.

28. The process of claim 25 further comprising the step of inputting the first and second signals into a computer means for calculating the rate of leakage of the storage tank.

* * * * *